May 29, 1928.  W. S. GEARHART  1,671,636
PIPE AND PIPE JOINT CONSTRUCTION
Filed Feb. 27, 1926 2 Sheets-Sheet 1
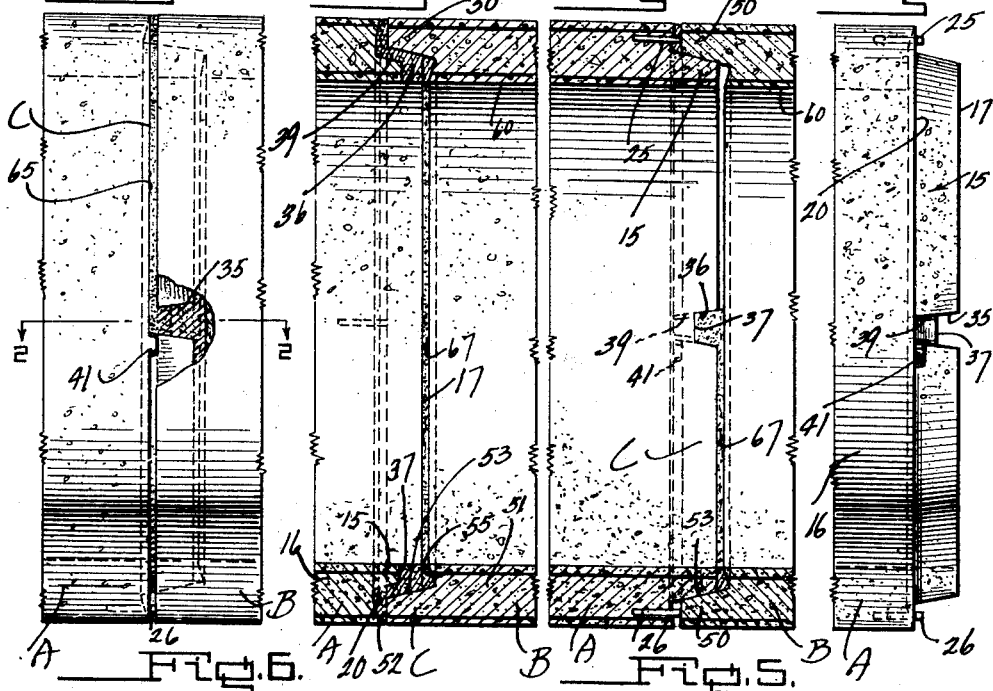
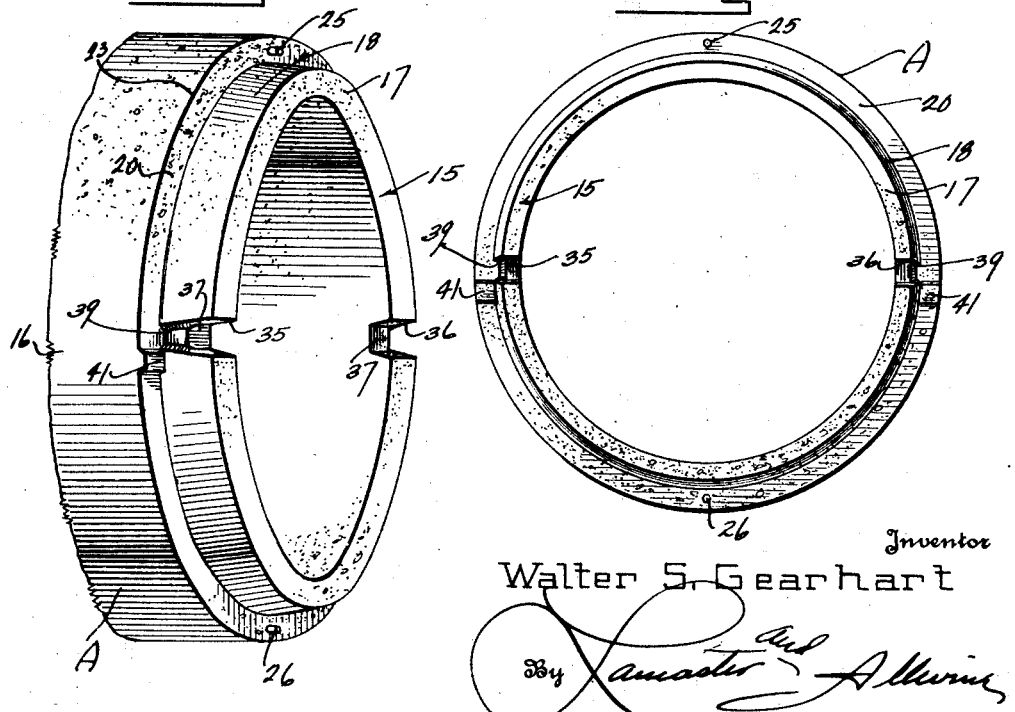
Inventor
Walter S. Gearhart May 29, 1928. 1,671,636
W. S. GEARHART
PIPE AND PIPE JOINT CONSTRUCTION
Filed Feb. 27, 1926 2 Sheets-Sheet 2
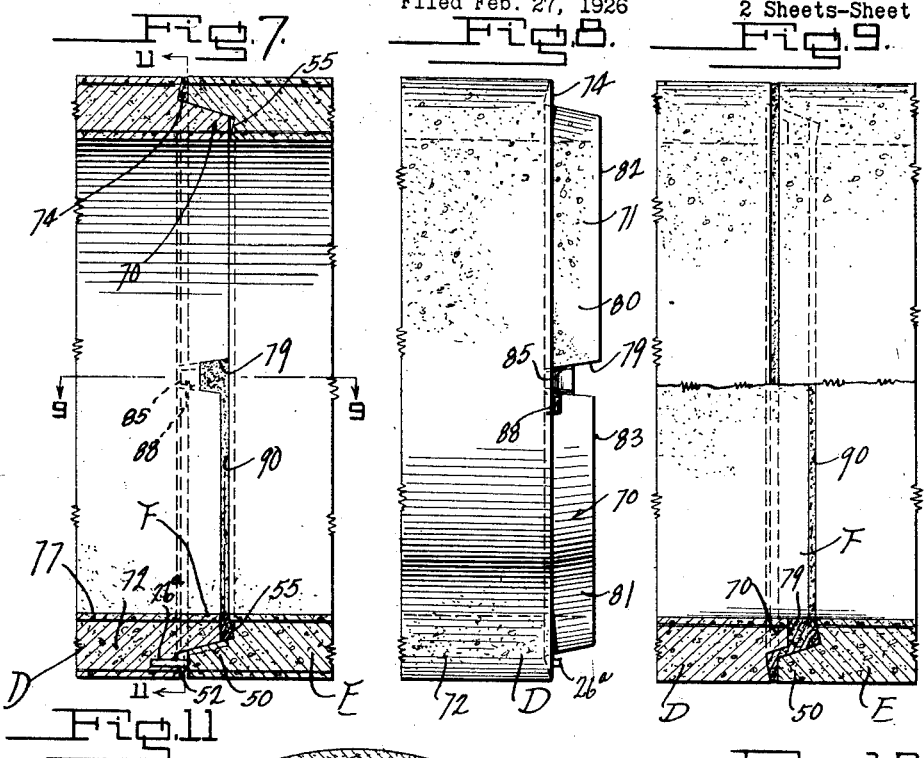
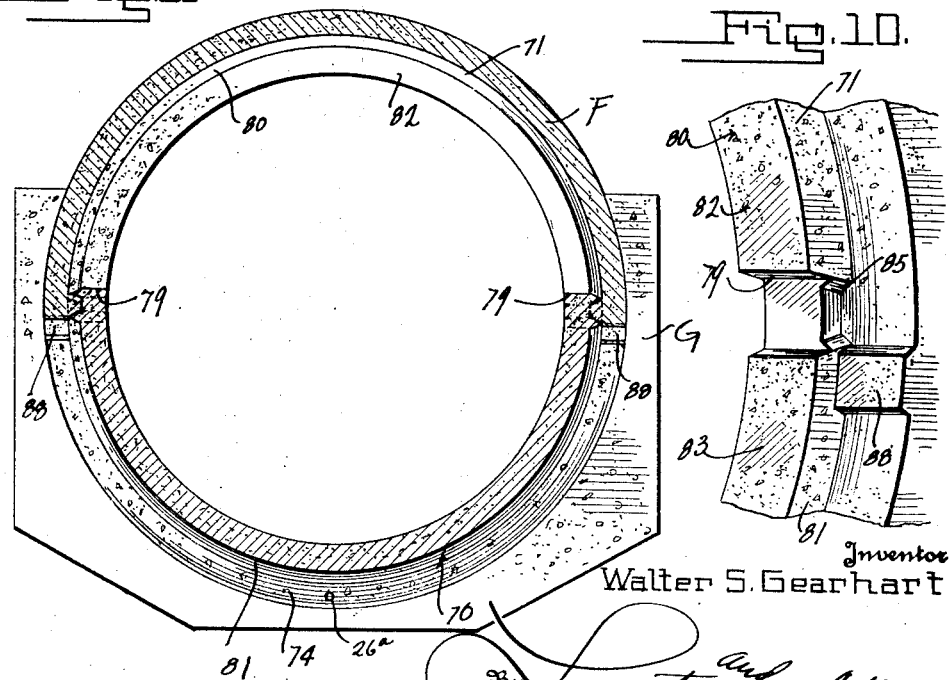
Inventor
Walter S. Gearhart Patented May 29, 1928.

1,671,636

UNITED STATES PATENT OFFICE.

WALTER S. GEARHART, OF ROBINSON, ILLINOIS.

PIPE AND PIPE-JOINT CONSTRUCTION.

Application filed February 27, 1926. Serial No. 91,090.

This invention relates to improvements in concrete pipe constructions.

The primary object of this invention is the provision of an improved sectional pipe or conduit construction having means cooperatively formed at the ends thereof for the provision of a novel leak-proof joint or connection.

A further object of this invention is the provision of an improved joint structure for sectional pipes or conduits of relatively large size, which will enable the practical and efficient jointed connection of the adjacent ends of pipe sections of the conduit in a leak-proof connection to provide a high pressure water tight joint.

A further object of this invention is the provision of an improved joint structure for pipe sections including novel spacing means for the adjacent ends of the sections to properly locate the bell and spigot ends of the pipe sections for the reception of a joint filler or binder mortar at the joint, with the same supported in a durable and efficient relation against liability of disconnection by reason of forces operating thereon.

Other objects and advantages of this invention will be apparent during the course of the following detailed description.

In the accompanying drawings, forming a part of this specification, and wherein similar reference characters designate corresponding parts throughout the several views, Figure 1 is a fragmentary side elevation of a joint construction formed at the juncture of the concrete pipe sections; the joint construction being shown partially in section.

Figure 2 is a horizontal view taken through the improved joint construction on a horizontal plane substantially on the line 2—2 of Figure 1, and showing a novel cross seal connection as a part of the joint construction.

Figure 3 is a vertical sectional view taken thru the improved joint construction at the adjacent ends of the pipes.

Figure 4 is a fragmentary side elevation of the spigot end of a concrete pipe, showing its novel formation, for cooperation in providing the novel joint.

Figure 5 is an edge elevation of the spigot end of a pipe.

Figure 6 is a perspective view of the spigot end of a pipe section, showing its novel construction.

Figure 7 is a vertical sectional view taken through a modified type of novel joint construction for pipe sections.

Figure 8 is a fragmentary side elevation of the spigot end of a pipe section embodying features of the novel joint illustrated in Figure 7.

Figure 9 is a view, partly in section, taken on a horizontal plane substantially on the line 9—9 of Figure 7.

Figure 10 is a fragmentary perspective view of the novel formation of the pipe section at the spigot end thereof.

Figure 11 is a vertical sectional view taken through the pipe section joint structure illustrated in Figure 7, substantially on the line 11—11 of this view; showing the pipe supported in a cradle.

In the drawings, wherein for the purpose of illustration are shown preferred and modified forms of this invention, the letters A and B may generally designate pipe sections formed in a cooperative manner to provide a novel joint construction C. The pipe sections D and E may also be provided, formed somewhat different at their connected ends to provide a novel joint F having some of the characteristics of the novel joint C.

Each of the pipe sections A, B, D, or E have one end thereof formed with a bell and the opposite end thereof formed with a spigot.

The pipe sections of the preferred form of joint construction C at the spigot end thereof are provided with a reduced spigot construction 15, which is shown on the pipe A of the joint C. This spigot 15, as is well understood, is less in thickness than the thickness of the body 16 of the pipe section A, and at its inner periphery the same lies flush with the inner periphery of the body 16. From its forward edge 17, however, the spigot flange 15 is tapered or sloped at its outer periphery 18 in a tapered diverging relation longitudinally of the axis of the pipe A, to a shoulder 20 formed at the juncture of the forward end of the body 16, with the spigot 15. The shoulder 20 is dished or inclined from the extreme outer edge 23 of the shoulder to the line of intersection with the sloping or tapered surface 18 of the spigot 15, so as to provide a wedge joint of the mortar adapted to rest therein as a part of the joint C, as will be subsequently described.

At the extreme top and bottom of each of the pipe sections, steel or metal pins 25 and 26 are embedded in the body of the pipe section adjacent the spigot 15 with the ends thereof projecting for a predetermined length beyond the plane of the shoulder 20; these projecting ends of the pins 25 and 26 being adapted to act as spacers against which the bell flange of an adjacent pipe section abuts to limit the assemblage of the sections A and B in a properly spaced mortar receiving relation to provide the joint C. Thus, the projecting ends of the pins 25 and 26 are less in length than the length of the spigot flanges 15 longitudinally of the pipe sections, as is readily obvious, and these projections of the pins 25 and 26 lie outwardly of the sloping surface 18 of the spigot flange 15. An important novel feature of the joint construction is that of recessing the spigot flange 15 inwardly of the forward edge 17 thereof, at the sides of the pipe sections, at diametrically opposed points in a horizontal plane through the axis of the pipe sections; these recesses 35 and 36 extending for substantially one-half the length of the spigot flange 15 along the axis of the pipe section, and through the entire thickness thereof. The recesses 35 and 36 are of wedge shaped formation; the opposite sides thereof converging for each of the recesses from the edge 17 to the flat bottom surface 37 of the recesses 35 and 36. Inwardly of the tapered side 18, the spigot flange 15, at diametrically opposed points is also provided with wedge shape recesses 39 aligning with and communicating with the recesses 35 and 36; the recesses 39 extending for approximately one-third, more or less, of the thickness of the spigot flange 15, and outletting on the exterior surface 18 of this spigot flange; the said recesses 39 extending from the bottoms of the recesses 35 and 36 to the shoulder 20 above described, of the body of the pipe section. The recesses or pockets 39 are of greatest dimension across the top thereof, at the sloping surface 18 and the sides thereof which are flush with the sides of the recesses 35 and 36 converge inwardly of the spigot flange to the bottom of the said recesses 39, as clearly illustrated in Figure 6 of the drawings, and elsewhere. Thus, in effect, the recesses 35 and 39, or 36 and 39 provide passageways at the sides of the spigot flange, from the shoulder 20 to the outer edge 17 of the spigot flange within which plastic material such as mortar may be placed to provide a cross seal between the inner and outer mortar joints of the joint C, as will be subsequently described.

Spacer or retaining lugs or projections 41 are provided integral with the body 16 of the pipe section, and more particularly at the shoulder 20, extending forwardly in projecting relation from the plane of the shoulder 20, immediately below each of the cross seal recesses; the forward surfaces thereof being plane, and said lugs projecting for the same distance from the shoulder 20 as the pins 25 and 26, to perform the dual function of acting as spacers and for retaining the mortar of the upper joint of the pipe section joint construction C as is illustrated in Figure 1 of the drawings, and as will be subsequently described.

As to the construction of the bell end of the pipe section B, the same is provided with an unbroken bell flange 50, which is of course of less thickness than the body 51 of the section B. The outer periphery of the bell flange 50 lies flush with the outer periphery of the body 51. The forward edge 52 of the bell flange 50 lies in a plane at right angles to the axis of the pipe section, and the inner surface 53 of the bell flange 50 is tapered or sloped in converging passageway diminishing relation from the outer edge 52, towards the passageway of the pipe B, to the shoulder 55. The shoulder 55 is formed at the inside of the pipe section B at the juncture of the bell flange 50 with the body 51, and this shoulder 55 faces forwardly towards the outer end of the pipe B, and it is inclined or tapered, extending with a taper diagonal with respect to the longitudinal axis of the pipe B, in a converging relation from its juncture with the surface 53 of the bell flange towards the open end of the pipe B, and this taper of the shoulder 55 is in acute angled intersecting relation with the inner periphery or passageway 60 through the pipe section B.

Referring to the assemblage of the pipe sections A and B to provide the joint C, the spigot flange 15 of the pipe section A is inserted into the socket or bell end of the pipe section B, in the relation illustrated in Figures 1, 2 and 3 of the drawings, until the forward edge 52 of the bell flange 50 abuts against the end edges of the spacer pins 25 and 26, and against the forward surfaces of the lugs 41. In this relation of parts the spigot flange 15 is received within the socket flange 50, with the tapered surface 18 in abutment or slightly spaced relation with the tapered surface 53 of the bell flange 50. In this relation of parts an annular exterior groove or channel 65 is provided circumferentially about the assembled pipes A and B, exteriorly thereof, obstructed only by the spacer pins 25 and 26, and the retaining lugs 41 which are positioned at opposite sides of the pipe sections. A cross section of this channel 65 as illustrated in Figures 2 and 3 of the drawings shows that due to the inclined shoulder 20, the same is of less width at the outer periphery of the pipe sections, and of greatest width immediately at the spigot flange 15. The upper half of this channel 65 above the retaining lugs 41 is filled with mortar or analogous binding cementitious material, and the retaining lugs 41 support this mortar in position above the cross seal recesses 36, 37, and 39, as illustrated in Figure 1 of the drawings.

At the inner periphery of the aligning pipes A and B an annular channel or groove 67 is also provided, formed by the spacing of the shoulder 55 of the pipe section D, and the forward edge 17 of the spigot flange 15. This channel 67 in cross section is of varying width, being of less width at the inner peripheries of the aligning pipes A and B and increasing in width therefrom to the flange 50, as illustrated in Figure 3 of the drawings. This channel 67 is filled with mortar or analogous cementitious material at the lower half thereof, between the cross seal recesses 35 and 36.

It is to be noted from Figure 3 of the drawings that at the inside or inner peripheries of the alignings pipes A and B, the recesses 35 and 36 are opened. The same are relatively large, providing offset openings from the channel 67, in which a hand or tamping tool may be inserted for depositing cementitious material or mortar therein, to fill the channels or recesses 35, 36, and 39, and thus provide a cross seal between the mortar filled upper portion of the channel 65 and the mortar filled lower portion of the inner channel 67. In this manner the joint construction C provides a cementitious seal peripherally about the pipe, and the mortar is supported against dislodgment by gravity; due to its wedge shape and thereby prevented from being forced out by reason of internal pressure; and by reason of the large recesses 35, 36 and 39 an effective cross seal is provided which may be efficiently filled. The purpose of the recesses 35 and 36 is to permit the cross seal to be placed from the inside of the pipe, and these cross seal recesses are not provided for the flow of mortar or binding material into the lower portion of the channel 67. They are sufficiently large to permit the insertion of a hand or analogous inserting tool.

Referring to the pipes D and E which provide the joint construction F, the same follow somewhat the construction of the pipes A and B above described. The pipe D has a spigot flange 70 thereon which has an external inclined or tapered surface 71 sloping from the juncture of the flange 70 with the body 72 of the pipe D. At the juncture of the pipe body 72 with the flange 70 a shoulder 74 is provided on a taper diagonal with respect to a plane intersecting the axis of the pipe at right angles; the shoulder 74 being disposed on a taper at acute angles with respect to the external periphery of the body 72, and sloping from the intersection with the external periphery of the pipe body 72 on a taper converging towards the passageway 77 through the pipe D.

At diametrically opposed points at the sides of the spigot flange 70 the same is provided with transverse cross seal recesses 79 which divide the spigot flange 70 into an upper portion 80, and a lower portion 81, each of which form substantially a 180° segment. The front edge 82 of the upper segment 80 is located in a vertical plane intersecting the axis of the pipe D at right angles and located at a greater distance from the shoulder 74 than is the forward edge 83 of the lower segmental portion 81 located with respect to the shoulder 74; the edge 83 also being disposed in a vertical plane intersecting the axis of the pipe D at right angles. The recesses 79 extend entirely through the thickness of the spigot flange 70 for substantially one-half the depth of the flange 70, and contiguous with the recesses 79 are diagrammatically opposed recesses 85 extending inwardly from the outer tapered surfaces 71 of the spigot flange; these recesses 85 extending only a short distance into the thickness of the flange 70 and one of each being contiguous with a recess 79 from the bottom of the recess 79 direct to the shoulder 74. Integral with the body 72 of the pipe and projecting forwardly from the shoulder 74 at diametrically opposed points, and immediately below the recesses 85 are spacing lugs 88, the forward surfaces of which are located in a predetermined spaced relation with respect to the edges 82 and 83 of the spigot flange portions 80 and 81.

The pipe section E is formed identically the same as the pipe section D above described for the form of invention A, having a bell flange or socket providing flange thereon, and with respect thereto the same reference characters have been applied to the pipe section E as are applied to the identical parts of the pipe section B.

Referring to the manner of assemblage of the pipes D and E, to provide the joint F, the spigot flange 70 of the pipe section D is inserted into the opening of the bell flange 50, until the forward edge 52 of the bell flange abuts against the forward surface or edge of the retaining lugs 88. In this position the inner vertical edge 82 of the longer segmental portion 80 of the spigot flange will abut against the inner peripheral edge of the shoulder 55 of the pipe section E in a closed tight joint connection, as illustrated in Figure 7 of the drawings. In this position of parts an outer peripheral groove or channel is provided at the joint of the pipes D and E, provided by the facing of the shoulders or edges 52 and 74 of the sections E and D respectively and in the upper half of this channel a binding material of cementitious nature is filled. Also, at the inner periphery of the pipe sections D and E a segmental channel 90 of about 180° is provided by reason of the facing of the spaced edge 83 of the spigot flange portion 81 and the inclined shoulder 55 of the pipe section E, and in this channel 90 a cementitious material is filled. The next step is to fill the cross seal passageways or recesses between the outer mortar filled channel and the inner mortar filled channel, and from the inner peripheries of the aligning pipes the mortar in the cross seal is filled by passing the same in the recesses 79 and from thence the same is forced into the recesses 85, as is obvious, thus providing a transverse seal between the outer and inner segmental shaped mortar filled channels, and providing a complete peripheral mortar seal about the pipes D and E, which is part of the joint construction F.

It is to be particularly noted that the upper half of the channel 67 for the form of joint C is not filled with mortar, as it is unnecessary, and the upper half of the joint construction F at the inner periphery of the pipes D and E, is sealed tight by the abutment of the facing edges of the pipe sections D and E. The lower half of the exterior channel below the retaining lugs 88 is also unfilled with mortar, but this may properly remain so, as it will be sealed by the cradle G in which the sewer or conduit formed by the pipes rests, as illustrated in Figure 11 of the drawings. In this Figure 11 is also clearly illustrated the complete peripheral seal at the joint between the meeting spigot and bell ends of adjacent pipe sections.

From the foregoing description of this invention it is apparent that a novel joint construction for relatively large pipes has been provided which most efficiently cooperates to provide a joint capable of withstanding high internal pressures. The cross seal between the internal and external mortar filled channels is important, and the same is wedge shaped and enlarged not only to permit the filling of the same from the interior of the pipe passageways, but it facilitates removal of the forms. The wedge recesses are located at the springing lines at the sides of the pipe, and the operator can place the filling cementitious material in the cross recesses by means of his hand or a tamping tool from the inside of the pipe.

If desired, a spacer pin $26^a$ may be embedded in the lower part of the section D, extending beyond the shoulder 74 for abutment with the shoulder 52 of the section E, to limit the assembled positioning of the sections D and E, and to prevent overbalancing of said sections when the joint is assembled.

If desired, the lugs 41 and 88, and the spacer pins 25, 26 and $26^a$ may all be made of concrete cast integral with their respective parts of the sections, or they may all be metal pins, whichever found the most desirable.

Various changes in the shape, size, and arrangement of parts may be made to the forms of invention herein shown and described, without departing from the spirit of the same or the scope of the claims.

I claim:

1. A joint between adjacent pipe sections comprising cooperative bell and spigot flanges substantially equal in length, spacing lugs on the shoulder at the base of the spigot whereby an exterior and interior groove is formed adjacent the base of the spigot and bell flanges respectively, recesses extending across the outside and ends of the spigot flange to form a channel from the exterior groove to the interior groove, one of the said lugs being located below each recess to form a dam in the exterior groove, whereby the upper part of the exterior groove, the recesses, and the interior groove may be filled with mortar to form a seal.

2. The joint of claim 1 in which the recesses diverge toward the end of the spigot.

3. The joint of claim 1 in which the walls of the exterior groove converge outwardly and the walls of the interior groove converge inwardly.

WALTER S. GEARHART.